Feb. 5, 1952 — E. G. ERSON — 2,584,794
FLUID PRESSURE BRAKE APPARATUS
Filed Feb. 25, 1950 — 2 SHEETS—SHEET 2
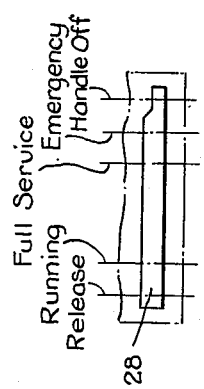
INVENTOR.
Erik G. Erson
BY Frank E. Miller
ATTORNEY Patented Feb. 5, 1952

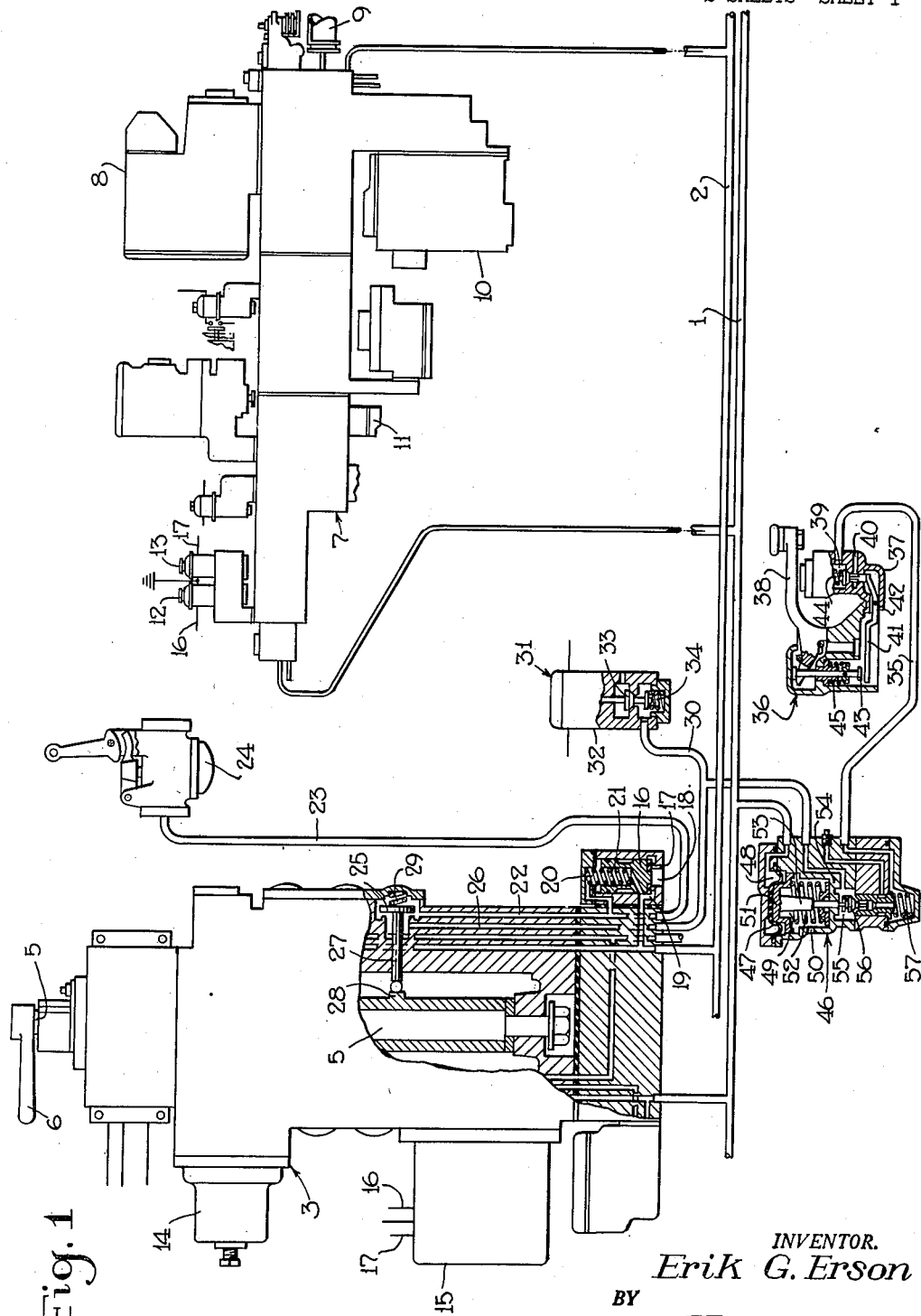

2,584,794

UNITED STATES PATENT OFFICE 2,584,794

FLUID PRESSURE BRAKE APPARATUS

Erik G. Erson, Wilkinsburg, Pa., assignor to Westinghouse Air Brake Company, a corporation of Pennsylvania Application February 25, 1950, Serial No. 146,365

5 Claims. (Cl. 303—18)

1

This invention relates to fluid pressure brake apparatus and more particularly to the type embodying means arranged to respond to an adverse traffic signal indication or an excess speed limit to automatically effect an application of brakes on a vehicle or train to stop same.

In the pending application of Claude M. Hines et al., Serial No. 93,862, filed May 18, 1949, now Patent No. 2,575,958, issued November 20, 1951, and assigned to the assignee of the present application there is disclosed a fluid pressure brake equipment for a railway type vehicle which equipment embodies a straight air pipe, an increase in pressure in which will effect a service application of brakes, and a brake pipe from which fluid under pressure is adapted to be vented at an emergency rate for effecting an emergency application of brakes. An operator's brake valve device is operative to vary the pressure in the straight air pipe in accordance with the position of a control handle between a running position and a full service position and to vent the brake pipe in an emergency position. The equipment further embodies a propulsion motor control device having a safety handle adapted normally to be held depressed by the operator to prevent operation of a brake application valve device to vent the brake pipe. If however, a sufficient straight air application of brakes, determined by the position of the brake valve handle, is in effect a suppression valve is operated by said handle to disconnect the brake application valve device from the safety handle to permit relief thereof by the operator. Further, the equipment embodies a trip valve device arranged for operation by a trip along the track upon which the vehicle operates to vent the brake pipe for effecting an emergency reduction in pressure therein.

It is now desired to replace the trip valve device with means for effecting operation of the brake application valve device in response to an adverse change in traffic conditions on the track on which the vehicle operates, as well as in response to the vehicle exceeding a chosen speed limit and it is desired that this means be effective in all positions of the brake valve handle except a handle off position without, however, loss of the suppression feature which permits the operator to let go of the propulsion motor control handle when a chosen degree of straight air application of brakes is in effect on the vehicle, and the principal object of the invention is the provision of arrangements for accomplishing these results.

2

Other objects and advantages will become apparent from the following more detailed description of the invention.

In the accompanying drawings: Figs. 1–1A, when arranged with the right hand edge of Fig. 1 matched to the left hand edge of Fig. 1A, is a diagrammatic view, partly in section and partly in outline, of a brake equipment embodying the invention; and Fig. 2 is a diagrammatic development view of a portion of an operator's brake valve device two of which are shown in Figs. 1–1A.

Description

The brake equipment shown in the drawings is mainly identical to that disclosed in the above mentioned Hines et al. application, in view of which the following description of said equipment will be limited to only such detail as considered necessary to a clear understanding of the invention.

As shown in the drawing, the reference numeral 1 designates a straight air pipe and the numeral 2 a brake pipe both of which are adapted to extend to opposite ends of the vehicle for connection with corresponding pipes on a connected vehicle of a train. The reference numerals 3 and 4 designate two identical operator's brake valve devices adapted to be located at opposite ends of the vehicle and to each of which is connected both the straight air pipe 1 and brake pipe 2. Each brake valve device comprises a control shaft 5 adapted to be turned by an operator's control handle 6 to a plurality of different positions, including a handle off position, as indicated by legends in Fig. 2. Only one brake valve handle 6 is provided per vehicle and is removable from and applicable to either brake valve device 3 or 4, according to which end of the vehicle is chosen for controlling the vehicle, only in the handle off position. At the non-control end of the vehicle, from which the handle 6 is removed, the brake valve shaft 5 will therefore be in its handle off position, while at the opposite or control end the handle 6 will be applied to the brake valve device for controlling the vehicle brakes.

The reference numeral 7 designates a brake controlling valve device comprising a relay 8 arranged to respond to pressure of fluid for providing fluid at a corresponding pressure in a brake cylinder device 9. 10 is an emergency valve device adapted to operate in response to an emergency reduction in pressure in brake pipe 2 to supply via a double check valve device 11 fluid under pressure to the relay valve device 8. 12 and 13 are application and release magnet valve devices for upon energization, supplying and releasing, respectively, fluid under pressure to or from the relay valve device 8 via the double check valve device 11 and at the same time to and from the straight air pipe 1.

Each brake valve device 3 and 4 further comprises a self-lapping valve device 14 arranged to be operated in accordance with the extent of movement of the handle 6 from the running position toward the full service position to supply fluid at a corresponding pressure to the straight air pipe 1 and also to a self-lapping switch device 15 for effecting operation of said switch device to control over train wires 16 and 17 operation of the application and release magnets 12 and 13. By this arrangement, when the brake valve handle 6 is moved out of running position toward full service position the self-lapping valve device 14 will supply fluid to the straight air pipe 1 at the brake valve device and at the same time the application magnet valve device 12 will supply fluid to said straight air pipe at the brake controlling valve device, the pressure of such fluid corresponding to the position of said handle and operating the relay valve device 8 to provide fluid at a corresponding pressure in the brake cylinder device 9. When the handle 6 is returned to running position the self-lapping valve device 14 will open the straight air pipe 1 to atmosphere and cause operation of the switch device 15 to energize the release magnet 13 to also open said straight air pipe to atmosphere whereupon the relay valve device will open the brake cylinder device 9 to atmosphere to release the vehicle brakes.

16 in each brake valve device 3 and 4 designates an emergency brake application valve in the form of a piston one side of which is arranged to cooperate with an annular valve seat rib 17 to close communication between a vent port 18 encircled by said rib and a space 19 encircling said rib, said space being open to brake pipe 2. At the opposite side of valve piston 16 is a chamber 20 containing a spring 21 acting on said piston for urging it toward seat rib 17. The chamber 20 is open to a passage 22 connected in turn by a pipe 23 to the usual conductor's valve device 24 and said chamber is also open through a port in the piston 16 to the space 19 whereby with the brake pipe 2 charged with fluid under pressure, said chamber, passage and pipe will also be normally charged to permit spring 21 to hold said piston seated in rib 17. Upon usual operation of the conductor's valve device 24 to open pipe 23 to atmosphere the fluid under pressure will be vented from the connected chamber 20 and permit brake pipe pressure acting in space 19 to unseat the respective valve piston 16 to vent fluid under pressure from the brake pipe 2 to atmosphere through the vent port 18 for thereby causing operation of the emergency valve device 10 to effect through the medium of relay valve device 8 and the brake cylinder device 9 an emergency application of brakes.

Each brake valve device 3 and 4 further comprises a cut-off valve in the form of a check valve 25 controlling communication between the passage 22 and a passage 26. The valve 25 has a stem 27 arranged to be operated by a cam 28 associated with the brake valve handle operated shaft 6, said cam being so designed, according to the invention, as to hold said valve open in all positions of said handle except handle off position, as brought out in the development of said cam in Fig. 2. In handle off position a spring 29 is adapted to seat valve 25 to close communication between passages 22 and 26.

At each brake valve device 3, 4 the passage 26 is connected to a pipe 30 which according to the invention leads to any suitable automatic train control means adapted to operate in response to a change in signal indication caused by an adverse traffic condition or in case of exceeding a chosen speed limit to vent said pipe. Such an automatic train control means may, by way of example, be of the general type disclosed in Patent 1,986,679 issued to L. V. Lewis on January 1, 1935, but is simply illustrated in the drawing by a magnet valve device 31 comprising a magnet 32 adapted to be normally energized to seat a valve 33 for holding fluid under pressure in pipe 30 and to become deenergized upon encountering an adverse traffic signal or condition or exceeding a chosen speed limit to permit opening of said valve by a spring 34 for venting fluid under pressure from said pipe. It will thus be apparent that at the control end of the vehicle in all positions of the brake valve handle 6, except the handle off position, the valve 25 being open, the brake application valve piston 16 is subject to control by the automatic train control means 31. At the non-operating end of the vehicle where the valve 25 is closed said valve prevents control of the brake application valve piston 16 by the respective train control means 31 but does not interfere with control of said piston by the respective conductor's valve device 24.

At each end of the vehicle, 35 designates a safety control pipe connected to a propulsion motor controller device 36 comprising a body portion 37 and the usual depressible safety control operating handle 38 for said body portion. Contained in the body portion 37 is a valve 39 controlling communication between the safety control pipe 35 and an atmospheric vent port 40. A lever 41 fulcrumed intermediate its ends on a pin 42 has one end engaging a stem projecting from valve 39 while the opposite end is arranged for engagement by one end of a plunger 43 the other end of which is connected to the handle 38. With the handle 38 in a depressed condition, in which it is shown in Fig. 1, the plunger 43 is lifted to permit seating of valve 39 by a spring 44, but upon removal of manual pressure from said handle, the pressure of a spring 45 acting on plunger 43 is adapted to operate lever 41 to open valve 39.

According to the invention, at each end of the vehicle a suppression valve device 46 is provided to control communication between the safety control pipe 35 and pipe 30 at that end. The suppression valve device comprises a casing containing a flexible diaphragm 47 at one side of which is a chamber 48 open to the straight air pipe 1. At the opposite side is a chamber 49 open to atmosphere through a port 50 and containing a follower 51 urged against said diaphragm by a spring 52. The pressure of spring 52 on diaphragm 47 is such as to prevent deflection of said diaphragm against said spring by less than a chosen pressure of fluid in the straight air pipe 1, said chosen pressure being of a value to cause a straight application of brakes on the vehicle of a degree to ensure the safety of the vehicle. The follower 51 has a stem 53 projecting through chamber 49 and a partition wall 54, separating said chamber from a chamber 55, into the latter chamber wherein a valve 56 is connected to the end of said stem for movement therewith. The valve 56 controls communication between chamber 55 and a chamber 57 to which the safety control pipe 35 is connected.

From the above description it will be seen that when no fluid under pressure is present in the straight air pipe 1 or when pressure of fluid in said pipe is less than the chosen degree above mentioned that at each end of the vehicle the suppression valve device 46 will open the safety control pipe 35 at that end to the respective pipe 30.

At the control end of the vehicle where valve 25 is open connecting pipe 30 to chamber 20 above the respective brake application valve piston 16, it will be noted that in order to prevent operation of said brake application valve piston to effect an emergency reduction in brake pipe pressure and thereby an emergency application of brakes when the pressure in the straight air pipe 1 is less than the chosen degree above mentioned, it is necessary that the safety control handle 38 be held depressed to permit valve 39 to remain seated. If the handle 38 were let go of and the valve 39 unseated an emergency application of brakes would occur. However with a straight air application of brakes in effect to a degree to ensure safety of the vehicle the suppression valve device 46 at the control end of the vehicle will close communication between pipe 30 and the safety control handle device 36 whereby the handle 38 may be released without causing operation of the respective brake application valve piston 16 to effect an emergency reduction in brake pipe pressure. It is to be noted that the suppression valve device 46 controlling communication between pipe 30 and the safety control pipe 35 has no control over the automatic train control means 31 so that at the control end of the vehicle the automatic train control means 31 is always in a condition to effect operation of the brake application valve piston 16 and thereby an emergency application of brakes to bring the vehicle to a stop in case of adverse traffic conditions or excess speed.

At the non-control end of the vehicle the suppression valve device 46 will operate the same and more or less in unison with the one at the controlling end of the vehicle but without any effect on account of the valve 25 in the respective brake valve device being closed.

Summary

It will now be seen that I have provided a modification of the fluid pressure brake apparatus disclosed in the above referred to pending application permitting use of the brake application valve device in the brake valve device for effecting an emergency application of brakes on a vehicle at any time when the vehicle encounters adverse traffic conditions or operates in excess of a chosen speed as well as in response to relief of operator's pressure on the usual propulsion safety control handle and embodying means for permitting removal of operator's pressure on the safety control handle in case an application of brakes in excess of a chosen degree is in effect. In case of a double end vehicle a valve operated by movement of the brake valve handle to handle off position cuts out the automatic and safety handle control of the brake application valve device at that end, said valve cutting in such control at the control end by movement of the brake valve handle out of handle off position.

Having now described my invention, what I claim as new and desire to secure by Letters Patent, is:

1. In a fluid pressure brake equipment, in combination, a straight air pipe, a brake pipe, an operator's brake valve device for supplying fluid under pressure to said straight air pipe, a brake application valve device operable by fluid under pressure to close a vent from said brake pipe and upon release of such fluid under pressure to open such vent, a pipe connected to said brake application valve device for releasing fluid under pressure therefrom, automatic train control means connected to said pipe normally closing a vent therefrom and automatically operative to open such vent for releasing fluid under pressure from said pipe and brake application valve device, a manually depressible motor control handle device operable upon depression to close a vent from said pipe and upon relief of manual pressure to open such vent, and a suppression valve device controlling communication between said pipe and handle device and operable by fluid in excess of a chosen pressure in said straight air pipe to close said communication and operable to open said communication at all lesser pressures in said straight air pipe.

2. In a fluid pressure brake equipment, in combination, a straight air pipe, a brake pipe, an operator's brake valve device comprising a handle having positions for effecting operation of said device to supply fluid under pressure to said straight air pipe and for venting fluid under pressure from said brake pipe and also having a handle off position, a brake application valve device for venting fluid under pressure from said brake pipe, automatic train control means automatically operative to effect operation of said brake application valve device, a manually depressible motor control handle device adapted to operate upon relief of manual pressure to effect operation of said brake application valve device, and means associated with said brake valve device operable in said handle off position of said handle to break the control connections between said brake application valve device and said automatic train control means and handle device.

3. In a fluid pressure brake equipment, in combination, a straight air pipe, a brake pipe, an operator's brake valve device comprising a handle having positions for effecting operation of said device to supply fluid under pressure to said straight air pipe and for venting fluid under pressure from said brake pipe and also having a handle off position, a brake application valve device operable upon release of fluid under pressure from a chamber to vent fluid under pressure from said brake pipe, automatic train control means automatically operative to release fluid under pressure from said chamber, a manually depressible motor control handle device operative upon relief of manual pressure to release fluid under pressure from said chamber, and valve means associated with said brake valve device operative in the handle off position of said handle to close communication between said chamber and said automatic train control means and handle device and operative upon movement of said handle out of said handle off position to open said communication.

4. In a fluid pressure brake equipment, in combination, a straight air pipe, a brake pipe, an operator's brake valve device comprising a handle having positions for controlling pressure of fluid in said straight air pipe and brake pipe and also having a handle off position, a brake application valve device operable upon charging a chamber with fluid under pressure to close a vent from said brake pipe and upon release of fluid under pressure from said chamber to open said vent, automatic safety means for venting fluid under pressure from said chamber, and valve means operable by said handle in said handle off position to close communication between said chamber and safety means and operable to open said communication in all other positions of said handle.

5. In a fluid pressure brake equipment, in combination, a straight air pipe, a brake pipe, an operator's brake valve device comprising a handle and operative in a zone of movement of said handle for varying pressure of fluid in said straight air pipe in proportion to the extent of movement of said handle from one end of said zone, said handle also having a handle off position, a brake application valve device operable upon charging a chamber with fluid under pressure to close a vent from said brake pipe and upon release of fluid under pressure from said chamber to open said vent, a pipe connected to said chamber, automatic train control means connected to said pipe and operative automatically to vent said pipe and thereby said chamber, a manually depressible motor control handle device operable upon relief of manual pressure to also vent said pipe, suppression means controlling communication between said pipe and handle device operable by fluid in excess of a chosen pressure in said straight air pipe to close said communication and operable to open said communication at all lesser pressures in said straight air pipe, and a valve operable by said brake valve handle in said handle off position to close communication between said chamber and pipe and operable to open such communication in all other positions of said brake valve handle.

ERIK G. ERSON.

REFERENCES CITED

The following references are of record in the file of this patent:

UNITED STATES PATENTS

| Number | Name | Date |
| --- | --- | --- |
| 1,703,892 | McCune | Mar. 5, 1929 |
| 2,256,283 | Hewitt et al. | Sept. 16, 1941 |